Oct. 17, 1944.        L. FREIMARK                2,360,557
                    SHEARING MACHINE
                  Filed Jan. 6, 1944

INVENTOR.
Leopold Freimark
BY Henry G. H. Metzler
           Agt.

Patented Oct. 17, 1944

2,360,557

UNITED STATES PATENT OFFICE 2,360,557

SHEARING MACHINE

Leopold Freimark, New York, N. Y.

Application January 6, 1944, Serial No. 517,217

2 Claims. (Cl. 30—240)

My invention relates to improvements in shearing machines in which rotary disks are used for cutting cloth, sheets, plates, or the like, and the objects of my improvement are, first, to provide an improved shearing action of the rotary disk by curving or positioning eccentrically its cutting edge so that it—while revolving—will combine the rotary shearing action with a reciprocating shearing action; second, to afford facilities for the proper adjustment of the pressure of the rotary cutting edge upon a not-rotating cutting edge cooperating with said rotary disk; and, third to reduce the friction between the not-rotating cutting edge and the rotary disk by disposing the rotary disk at acute angles to said not-rotating cutting edge.

Further objects of the instant invention reside in any novel feature of construction or operation or novel combination of parts present in the embodiment of the invention described and shown in the accompanying drawing whether within or without the scope of the appended claims and irrespective of other specific statements as to the scope of the invention contained herein.

In the drawing.

The same numerals refer to the same parts throughout the several views.

Figure 1:
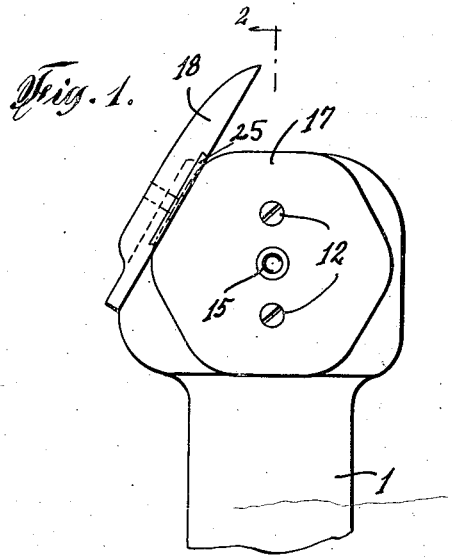
Figure 1 is a side elevation of a preferred embodiment of my invention partially broken away.
Figure 2:
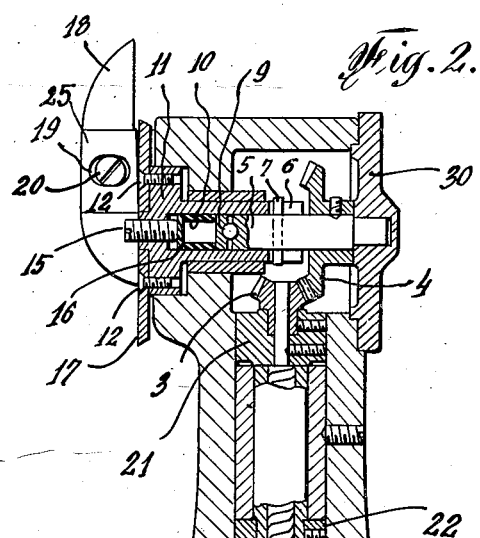
Figure 2 is a sectional view on the line 2—2 of Figure 1.
Figure 3:
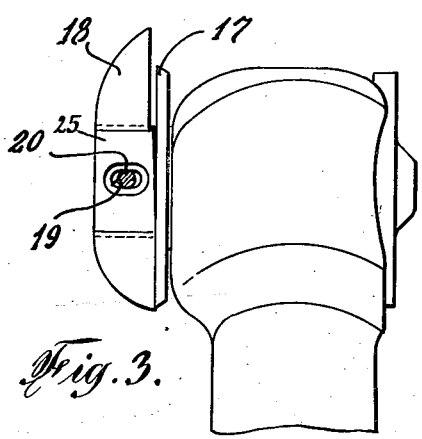
Figure 3 is a front elevation of said embodiment.

Referring first to Figures 1, 2, and 3, the numeral 1 denotes to a handle-shaped hollow body into which a flexible shaft 2 is extended. A bevel gear pinion 3, which is driven by shaft 2 engages another bevel gear pinion 4, which is screwed to shaft 5. A pin 7 radially extending through shaft 5 engages a longitudinal slot 6, which is in the rear portion of a hollow shaft 11. A rotary disk 17 is screwed to the front portion of the hollow shaft 11 by means of screws 12 or in any other suitable manner.

Figures 4, 5:
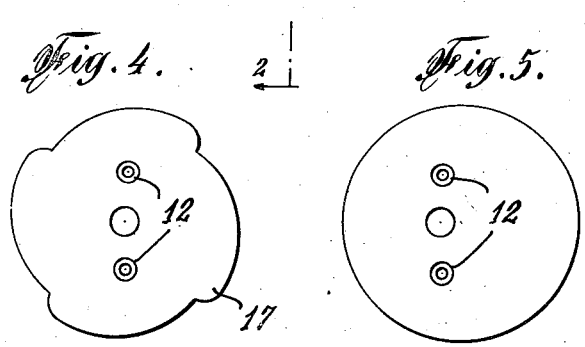
Figure 4 is a plan view of a modification of a detail.
Figure 5 is a plan view of another modification of the detail shown in Figure 4.

A pointed member 18, to which a plate 25 is laterally adjustably fastened by means of a screw 20 extending through a slot 19, is affixed to the outer side of the top portion of body 1. The plate 25 is mounted in a plane at right angles to the rotary disk 17, and the edge of the plate 25 adjacent to the disk 17 constitutes a not-rotating cutting edge adapted to cooperate with the cutting edge of the rotary disk 17. Said not-rotating cutting edge is preferably disposed to disk 17 at an acute angle and just inside the periphery of the disk 17 as may be seen in Figs. 2 and 3, so that only the rotating edge and its immediate vicinity, but not the whole face of disk 17, is in frictionary engagement with said not-rotating cutting edge. I prefer to make the rotary disk 17 either polygonal as shown in Figure 1, or irregularly curved as shown in Figure 4, or eccentric as shown in Figure 5, or to dispose its cutting edge in any other suitable manner eccentrically or curved to shaft 11, which carries disk 17. By do doing, it will be obvious, I combine the rotary shearing action with a reciprocating shearing action; thus I attain a higher shearing efficiency than that attained with ordinary shears or the like. This arrangement will cause an effective shearing action even if the cutting edges of disk 17 are worn and are no longer sharp, it will—to a certain extent—cause a constant sharpening of the cutting edge of disk 17 when the same revolves.

I also prefer to press the rotary disk 17 axially against said not-rotating cutting edge of the part 18 and 25 and to provide facilities for the proper adjustment of the axial pressure. This feature of my invention is best carried out in the manner shown in Fig. 2 where it will be seen that a set screw 15 centrally screwed into the hollow shaft 11 and extending through disk 17, is adapted to press upon a disk 16 which is arranged before a resilient medium 10 (a piece of rubber, as in the instant showing, or a spring, or the like). The resilient medium 10 is adapted to be shifted and to expand axially within the hollow shaft 11 and to act upon shaft 5, preferably over an axial bearing 9, as in the present instance. The axial pressure of shaft 5 will be received by a bearing bracket 30, so that a manipulation of the set screw 15 will cause only a change of the axial pressure of disk 17 against the parts 18 and 25.

Instead of the bevel gears 3 and 4 and the flexible shaft 2, which turns in bearings 21 and 22, any other method of actuating shaft 5 can be used; for instance, it can be connected to an electric motor (not shown), which may be located within the body 1, or to a compressed air motor and the like.

Further modifications will be apparent to those skilled in the art and it is desired, therefore, that my invention be limited only by the prior art and the scope of the appended claims.

Having thus described my invention, what I claim and desire to secure by Letters Patent in the United States is:

1. A shearing machine comprising a rotary disk having a curved cutting edge, a hollow shaft carrying said disk at one end and being provided with a longitudinal slot at its other end, a shaft adapted to be driven by pinions and extending into the slotted portion of said hollow shaft, a pin radially extending through said shaft and being adapted to engage said longitudinal slot, a handle-shaped body the top portion of which carries said shafts, a laterally adjustable not-rotating plate secured to the outer side of the top portion of said body at right angles to said disk and having a cutting edge that touches said disk and is disposed at an acute angle thereto, and adjustable resilient means for pressing said rotary disk away from said shaft and toward the cutting edge of said plate.

2. The combination, in a shearing machine having a revolving knife carried by the top portion of a handle-shaped body, of a hollow shaft carrying said revolving knife at one end and having a longitudinal slot at its other end, with a drive shaft adapted to be rotated by means of pinions and extending into the slotted portion of said hollow shaft, and a laterally adjustable not-rotating blade having a cutting edge and being secured to the outer side of the top portion of said handle-shaped body in such a manner that it touches the side of said revolving knife near its periphery and having a cutting edge that is disposed at an acute angle to said revolving knife, said hollow shaft and said driving shaft being non-rotatably connected to each other by a pin which extends radially through said drive shaft and which engages the slotted end portion of said hollow shaft, and adjustable resilient means being located within said hollow shaft and adapted to press said hollow shaft and the knife toward said non-rotating blade, all substantially as described.

LEOPOLD FREIMARK.